(12) United States Patent
Chebrolu (10) Patent No.: US 7,181,504 B1
(45) Date of Patent: Feb. 20, 2007

(54) SYSTEM AND METHOD FOR SELECTING A MODEM FOR SERVICE

(75) Inventor: Prasad Y. Chebrolu, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/406,381

(22) Filed: Sep. 27, 1999

(51) Int. Cl.
*G06F 15/16* (2006.01)

(52) U.S. Cl. ....................................... 709/219

(58) Field of Classification Search ................ 709/219, 709/200
See application file for complete search history.

(56) References Cited

U.S. PATENT DOCUMENTS

| | | | | |
|---|---|---|---|---|
| 4,679,227 A | 7/1987 | Hughes-Hartogs | ........... | 379/98 |
| 4,731,816 A | 3/1988 | Hughes-Hartogs | ........... | 379/98 |
| 4,833,706 A | 5/1989 | Hughes-Hartogs | ........... | 379/98 |
| 5,054,034 A | 10/1991 | Hughes-Hartogs | ............. | 375/8 |
| 5,199,071 A | 3/1993 | Abe et al. | ..................... | 379/98 |
| 5,202,884 A | 4/1993 | Close et al. | ............... | 370/94.1 |
| 5,337,348 A | 8/1994 | Yamazaki et al. | ............ | 379/94 |
| 5,339,355 A | 8/1994 | Mori et al. | .................... | 379/94 |
| 5,408,522 A | 4/1995 | Ikehata et al. | ................ | 379/98 |
| 5,495,483 A | 2/1996 | Grube et al. | ............... | 370/95.1 |
| 5,546,379 A * | 8/1996 | Thaweethai et al. | .......... | 370/17 |
| 5,671,251 A * | 9/1997 | Blackwell et al. | .......... | 375/222 |
| 5,828,583 A * | 10/1998 | Bush et al. | ............ | 364/551.01 |
| 5,961,608 A * | 10/1999 | Onosaka et al. | ............ | 709/249 |
| 6,012,088 A * | 1/2000 | Li et al. | ...................... | 709/219 |
| 6,032,193 A * | 2/2000 | Sullivan | ...................... | 709/239 |
| 6,035,020 A * | 3/2000 | Weinstein et al. | ........ | 379/93.09 |
| 6,363,426 B1 * | 3/2002 | Yon et al. | .................... | 709/226 |

FOREIGN PATENT DOCUMENTS

JP          63-76648          4/1988

\* cited by examiner

*Primary Examiner*—David Y. Eng
(74) *Attorney, Agent, or Firm*—Baker Botts L.L.P.

(57) ABSTRACT

An access server includes a plurality of modems, a memory, an allocation module, and a telecommunications interface. Each modem is associated with a modem identifier. The memory stores a performance attribute for each modem. The allocation module, coupled to the memory, receives a modem request and selects a modem for service according to the modem's performance attribute. The telecommunications interface, coupled to the allocation module, couples a remote modem to the selected modem.

36 Claims, 5 Drawing Sheets

FIG. 1

| CARD/SLOT NUMBER | MODEM NUMBER | CALL SUCCESS RATE | NUMBER OF CALLS | DATA TRANSFER RATE | NUMBER OF CONNECTIONS |
|---|---|---|---|---|---|
| 2 | 5 | 0.99 | 100 | 52.0 | 99 |
| 1 | 4 | 0.98 | 50 | 56.0 | 49 |
| 3 | 7 | 0.95 | 40 | 44.0 | 38 |
| ... | ... | ... | ... | ... | ... |
| 3 | 8 | 0.40 | 20 | 2.4 | 8 |
| 1 | 99 | 0.10 | 10 | 1.2 | 1 |

| CARD/SLOT NUMBER | MODEM NUMBER | CALL SUCCESS RATE | DATA EXCHANGE RATE |
|---|---|---|---|
| 1 | 25 | 0.99 | 52.0 |
|   | 2 | 0.95 | 56.6 |
|   | ⋮ | ⋮ | ⋮ |
|   | 44 | 0.30 | 28.8 |
| 2 | 56 | 0.78 | 36.2 |
|   | 7 | 0.07 | 1.2 |
|   | ⋮ | ⋮ | ⋮ |
|   | 64 | 0.03 | 2.4 |
| 3 | 9 | 0.96 | 56.2 |
|   | 27 | 0.91 | 34.6 |
|   | ⋮ | ⋮ | ⋮ |
|   | 86 | 0.32 | 12.2 |

FIG. 5B though the allocation module selects modems for
SYSTEM AND METHOD FOR SELECTING A MODEM FOR SERVICE

TECHNICAL FIELD OF THE INVENTION

This invention relates generally to the field of data communications and, more specifically, to a system and method for selecting a modem for service.

BACKGROUND OF THE INVENTION

Computers use modems to communicate and receive data over existing communication infrastructures, such as telephone networks and cable networks. A typical analog modem receives digital data from a computer and converts the digital data into a series of analog signals for transmission over a twisted-pair telephone line. An analog modem also receives analog signals from the telephone line and converts the analog signals into digital data for use by the computer. Similarly, digital subscriber line (DSL) technologies allow existing twisted-pair telephone lines to simultaneously communicate both voice and data signals at higher rates than traditional analog modems. In addition, other modems, such as cable modems and wireless modems, communicate and receive data using other communication media.

To communicate with one or more client computers, service providers typically use an access server that includes a pool of modems. When the access server receives an initial communication from a client computer, the server allocates the communication to one of the available modems from the modem pool. As service providers continue to demand higher performance from access servers, existing allocation methods have become increasingly unsatisfactory.

SUMMARY OF THE INVENTION

In accordance with the present invention, a system and method for selecting a modem for service is provided that substantially eliminates or reduces disadvantages or problems associated with previously developed systems and methods.

In one embodiment, an access server includes a plurality of modems, a memory, an allocation module, and a telecommunications interface. Each modem is associated with a modem identifier. The memory stores a performance attribute for each modem. The allocation module, coupled to the memory, receives a modem request and selects a modem for service according to the modem's performance attribute. The telecommunications interface, coupled to the allocation module, couples a remote modem to the selected modem.

In another embodiment, an apparatus selects a modem for service. The apparatus includes a memory and an allocation module. The memory stores a performance attribute for a plurality of modems. The allocation module, coupled to the memory, receives a modem request, selects a modem for service according to a performance attribute stored in the memory, and communicates a modem identifier associated with the selected modem.

The present invention provides a number of important technical advantages. Unlike previous techniques, the present invention provides an allocation module that selects modems for service according to performance attributes of the modems. As a result, the allocation module may select higher-performing modems for service over lower-performing modems, thereby improving the overall performance of the access server. In addition, by removing modems from service according to the performance attributes of the modems, the allocation module prevents modems that provide inadequate service from degrading the overall operation of the access server. Also, by selecting modems for service according to user profiles, the allocation module also ensures that users receive modem services that satisfy their particular profiles, needs, or service levels. For these and other readily apparent reasons, the present invention represents a significant advance over prior art systems and methods.

BRIEF DESCRIPTION OF THE DRAWINGS

To provide a more complete understanding of the present invention, and for further features and advantages thereof, reference is now made to the following description taken in conjunction with the accompanying drawings, in which.

DETAILED DESCRIPTION OF THE DRAWINGS

Figure 1:
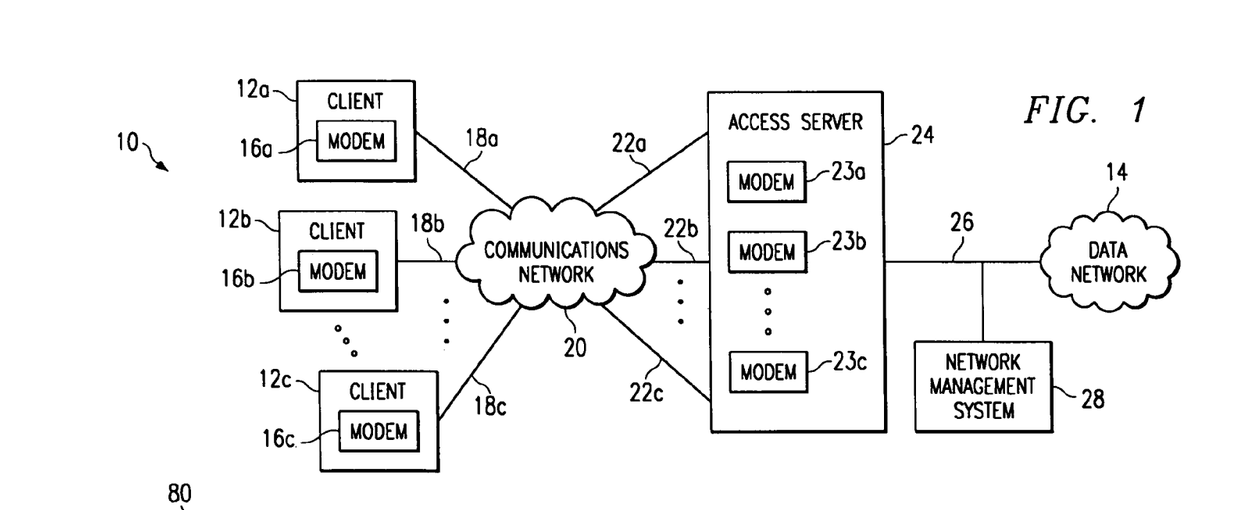
FIG. 1 illustrates a telecommunications system that uses an access server to communicate data between client computers and a data network.

FIG. 1 illustrates a telecommunications system 10 that uses an access server 24 to communicate data between client computers 12a, 12b and 12c (collectively, client computers 12) and a data network 14.

Client computers 12 use modems 16a, 16b and 16c (collectively, modems 16) to communicate with access server 24 using a communications network 20. Client computers 12 may be personal computers, work stations, personal digital assistants, or any other suitable processing or communications devices. Client computers 12 communicate digital data to modems 16, and modems 16 convert the digital data into information that communications network 20 may communicate to access server 24. Modems 16 also receive information from access server 24 using communications network 20 and convert the received information into digital data for use by client computers 12. Although modems 16 are shown as internal to computers 12, modems 16 may be integral to or separate from computers 12 according to particular needs. Modems 16 may be standard analog modems, digital subscriber line modems, cable modems, wireless modems, or any other suitable modem technology that supports communication between client computers 12 and access server 24 using communications network 20.

Communications network 20 communicates information between client computers 12 and access server 24. Communications network 20 may include a telephone network, a wireless network, a cable network, or any other suitable medium for communicating information. Links 18a, 18b and 18c (collectively, links 18) couple communications network 20 to client computers 12, and links 22a, 22b and 22c (collectively, links 22) couple communications network 20 to access server 24. Links 18 and 22 may include any suitable wireless, wire-line, or other communication paths and may be associated with one or more intermediate components. In a particular embodiment, links 18 are twisted-pair telephone lines, and links 22 are telecommunications cables enclosing twisted-pair telephone lines.

Access server 24 uses modems 23a, 23b and 23c (collectively, modems 23) to communicate with client computers 12 using communications network 20. When client computer 12 initiates a communication with access server 24, access server 24 receives initiation information from client computer 12 using communications network 20 and, as explained in further detail below, selects one of modems 23 for service according to a performance attribute associated with selected modem 23. Access server 24 communicates the initiation information received from client computer 12 to selected modem 23, and modem 23 negotiates with modem 16 of client computer 12 to establish a successful connection. After agreeing on a standard for communication, which may include a communication protocol, data transfer rate, an error correction format, and/or a rate of compression, modem 23 of access server 24 communicates with modem 16 of client computer 12 using communications network 20. Modem 23 receives information from communications network 20 and converts the information into digital data for communication to data network 14. Modem 23 also receives digital data from data network 14 and converts the digital data into information that communications network 20 may communicate to client computer 12. Although modems 23 are shown as internal to access server 24, modems 23 may be integral to or separate from access server 24 according to particular needs. Modems 23 may be standard analog modems, digital subscriber line modems, cable modems, wireless modems, or any other suitable modem technology that supports communication between data network 14 and client computers 12 using communications network 20.

Data network 14 receives digital data from access server 24 and communicates digital data to access server 24 using link 26. Data network 14 may include a local-area network (LAN), a wide-area network (WAN), the Internet, or any other suitable group of one or more linked computers. Link 26 may include any suitable wireless, wire-line, or other communications path and may be associated with one or more intermediate components.

Network management system 28, which couples to access server 24 using link 26, manages the operation of access server 24. As described in further detail below, network management system 28 receives status information and alarm conditions from access server 24. The status information relates to the performance of modems 23, and the alarm conditions indicate potential problems with the operation of access server 24. Network management system 28 presents the status information and alarm conditions to a user, so that the user may properly manage the operation of access server 24. Using network management system 28, the user may communicate control instructions to remove any of modems 23 from service or to return any of modems 23 to service.

Figure 2:
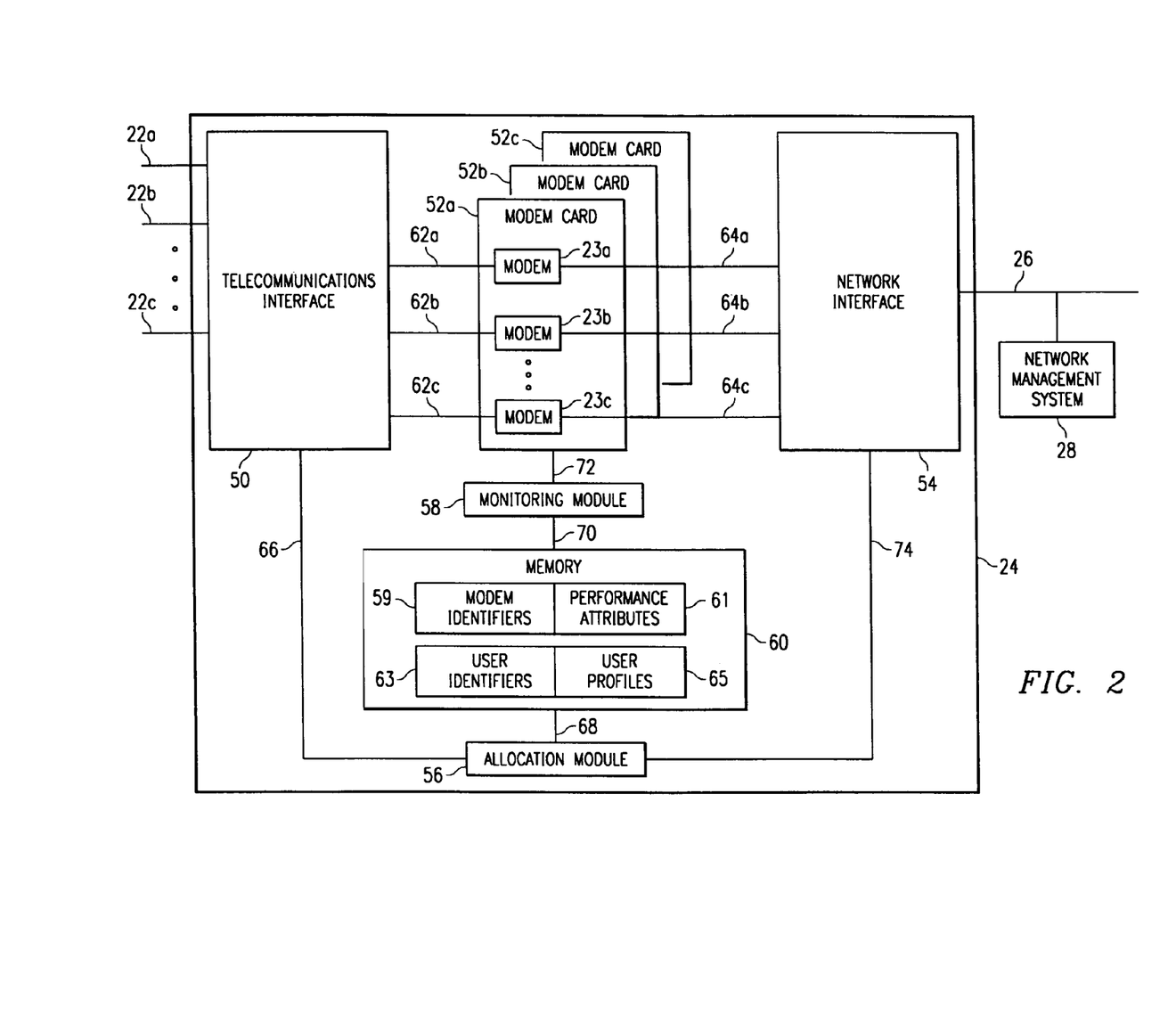
FIG. 2 is a block diagram of an exemplary access server that selects a modem for service according to a performance attribute of the modem.

FIG. 2 is a block diagram of access server 24 that selects one of modems 23 for service according to a performance attribute 61 of selected modem 23. Access server 24 includes a telecommunications interface 50, modems 23, network interface 54, allocation module 56, monitoring module 58, and memory 60. Unlike prior devices, when client computers 12 initiate communications with access server 24, access server 24 allocates the communications to modems 23 according to performance attributes 61 of modems 23. As described in further detail below, monitoring module 58 monitors the performance of modems 23 and stores performance attributes 61 for modems 23 in memory 60, and allocation module 56 selects modems 23 for service according to stored performance attributes 61.

Telecommunications interface 50 communicates information between links 22 coupled to communications network 20 and modems 23. When client computer 12 initiates a communication with access server 24, telecommunications interface 50 receives initiation information from one of links 22. In response to receiving the initiation information, telecommunications interface 50 communicates a modem request to allocation module 56 using link 66. As explained in further detail below, allocation module 56 selects one of available modems 23 for service according to performance attribute 61 of selected modem 23 and communicates a modem identifier 59 associated with selected modem 23 to telecommunications interface 50. Telecommunications interface 50 receives modem identifier 59 and communicates the initiation information from link 22 to selected modem 23 using one of links 62a, 62b and 62c (collectively, links 62).

In a particular embodiment, telecommunications interface 50 communicates a user identifier 63 with the modem request so that allocation module 56 may select modem 23 for service according to a user profile 65 associated with user identifier 63. In such an embodiment, telecommunications interface 50 generates user identifier 63 in response to receiving initiation information from link 22. For example, telecommunications interface 50 may associate user identifiers 63 with links 22 and, in response to receiving initiation information, identify user identifier 63 associated with link 22 from which telecommunications interface 50 received the initiation information. Alternatively, telecommunications interface 50 may generate user identifier 63 based on user information received from link 22. After generating user identifier 63, telecommunications interface 50 communicates user identifier 63 to allocation module 56 with the modem request. As explained in further detail below, allocation module 56 identifies user profile 65 associated with user identifier 63 and selects one of available modems 23 for service according to user profile 65.

Modems 23 receive initiation information from telecommunications interface 50, negotiate connections with modems 16 of client computers 12, and communicate data between client computers 12 and data network 14. After receiving initiation information from telecommunications interface 50, modems 23 of access server 24 negotiate with modems 16 of client computers 12 to establish a successful connection. Modems 23 of access server 24 and modems 16 of client computers 12 must agree on a standard for communication, which may include a communication protocol, a data transfer rate, an error correction format, and/or a rate of compression. After agreeing on a standard for communication, modems 23 of access server 24 communicate with modems 16 of client computers 12 using communications network 20. Modems 23 receive information from communications network 20 using telecommunications interface 50, convert the information into digital data for use by data network 14, and communicate the digital data to data network 14 using network interface 54. Modems 23 of access server 24 also receive digital data from data network 14 using network interface 54, convert the digital data into information that communications network 20 may communicate to client computers 12, and communicate the information to communications network 20 using telecommunications interface 50. Links 62 and links 64a, 64b and 64c (collectively, links 64) couple modems 23 to telecommunications interface 50 and network interface 54, respectively. Links 62 and 64 may support serial, parallel, or any other suitable form of communication and may be associated with one or more intermediate components. In a particular embodiment, modems 23 are mounted to one or more modem cards 52a, 52b, and 52c (collectively, modem cards 52), and modem cards 52 are coupled to a backplane of access server 24. In such an embodiment, access server 24 may include any suitable number of modem cards 52, and modem cards 52 may include any suitable number of modems 23.

Network interface 54 communicates data between modem cards 23 and data network 14. Network interface 54 receives digital data from modems 23 using links 64 and communicates the digital data to data network 14 using link 26. Network interface 54 also receives digital data from data network 14 using link 26 and communicates the digital data to modems 23 using links 64. In addition, network interface 54 communicates information between allocation module 56 and network management system 28. As described in further detail below, network interface 54 receives status information and alarm conditions from allocation module 56 and communicates the status information and alarm conditions to network management system 28. Network interface 54 also receives control instructions from network management system 28 and communicates the control instructions to allocation module 56.

Memory 60 stores at least one performance attribute 61 for each modem 23. Performance attribute 61 may be a call-success rate, an average data transfer rate, or any other suitable characteristic related to the performance of modem 23. A call success rate indicates the fraction of calls received by modem 23 in which modem 23 successfully established a connection with modems 16 of client computers 12. For example, in a particular embodiment, a call success rate of 0.80 indicates that modem 23 successfully negotiated a connection in eight out of every ten calls that it received. To calculate the call success rates of modems 23, memory 60 may also store the numbers of calls received by each modem 23. An average data transfer rate indicates the average speed at which modem 23 exchanged data with modems 16 after establishing a successful connection. The data transfer rate may relate to upstream and/or downstream communication between access server 24 and clients computers 12. To calculate the data transfer rates of modems 23, memory 60 may also store the numbers of connections successfully established by each modem 23. As explained in further detail below, allocation module 56 selects modems 23 for service according to performance attributes 61 of modems 23.

Memory 60 also stores user profiles 65. Each user profile 65 is associated with one or more users and includes information relating to the selection of modems 23 to serve the associated users. In a particular embodiment, user profile 65 may identify a subset of modems 23 assigned to the associated users. In another embodiment, user profile 65 may indicate a criterion related to performance attributes 61 of modems 23. For example, if performance attributes 61 of modems 23 are call success rates, user profile 65 may indicate a minimum or maximum call success rate for modems 23 that allocation module 56 may select to serve the associated users. Similarly, if performance attributes 61 of modems 23 are average data transfer rates, user profile 65 may indicate a minimum or maximum average data transfer rate for modems 23 that allocation module 56 may select to serve the associated users. User profiles 65 may include any parameters or conditions that allocation module 56 may use to establish individual or group service levels based on performance attributes 61 of modems 23. As described in further detail below, allocation module 56 may receive user identifier 63 with a modem request, identify user profile 65 associated with user identifier 63, and select one of modems 23 for service according to user profile 65.

Monitoring module 58 stores performance attributes 61 for modems 23 in memory 60. At initialization, monitoring module 58 identifies each modem 23 and stores default performance attribute 61 for each identified modem 23 in memory 60. For example, if performance attributes 61 are call success rates, monitoring module 58 stores in memory 60 a default call success rate or a default number of calls for each identified modem 23. In a particular embodiment, the default call success rate is 1.00, indicating that modems 23 have successfully negotiated a connection for every attempted call, and the default number of calls is zero. On the other hand, if performance attributes 61 are average data transfer rates, monitoring module 58 stores in memory 60 a default average data transfer rate or a default number of connections for each modem 23. In a particular embodiment, the default average data transfer rate is the maximum data transfer rate, and the default number of connections is zero.

During the operation of access server 24, monitoring module 58 monitors the performance of modems 23 and modifies performance attributes 61 of modems 23. When one of modems 23 receives initiation information from telecommunications interface 50, monitoring module 58 determines whether modem 23 successfully negotiates a connection with modem 16 of client computer 12. If modem 23 successfully negotiates a connection with modem 16 of client computer 12, then monitoring module 58 increases the call success rate of modem 23 stored in memory 60, and if selected modem 23 fails to negotiate a connection, then monitoring module 58 decreases the call success rate of modem 23 stored in memory 60. In a particular embodiment, monitoring module 58 modifies the call success rate and number of calls for modem 23 according to the following formulas, where the variable "Success" is 1 if modem 23 successfully negotiates a connection and 0 if modem 23 fails to negotiate a connection:

$$\text{Call Success Rate} = \frac{\text{Call Success Rate} \times \text{Number of Calls} + \text{Success}}{\text{Number of Calls} + 1}$$

Number of Calls=Number of Calls+1

In another embodiment, monitoring module 58 performs a weighted average calculation to more heavily emphasize the recent performance of modem 23. In such an embodiment, monitoring module 58 modifies the call success rate of modem 23 by using the following formula, in which the variable "Weight Factor" determines the extent to which recent performance is emphasized over past performance (the smaller the weight factor, the more emphasis applied to recent performance):

$$\text{Call Success Rate} = \frac{\text{Call Success Rate} \times \text{Weight Factor} + \text{Success}}{\text{Weight Factor} + 1}$$

When one of modems 23 successfully negotiates a connection with modem 16 of client computer 12, monitoring module 58 determines the data transfer rate established between modem 23 and modem 16 and accordingly modifies the average data transfer rate of modem 23. In a particular embodiment, monitoring module 58 modifies the average data transfer rate and number of connections for modem 23 according to the following formulas:

$$\text{Average } DTR = \frac{\text{Average } DTR \times \text{Number of Connections} + \text{Established } DTR}{\text{Number of Connections} + 1}$$

$$\text{Number of Connections} = \text{Number of Connections} + 1$$

In another embodiment, monitoring module 58 performs a weighted average calculation to more heavily emphasize the recent performance of modem 23. In such an embodiment, monitoring module 58 modifies the average data transfer rate of modem 23 by using the following formula, in which the variable "Weight Factor" determines the extent to which recent performance is emphasized over past performance (the smaller the weight factor, the more emphasis applied to recent performance):

$$\text{Average } DTR = \frac{\text{Average } DTR \times \text{Weight Factor} + \text{Established } DTR}{\text{Weight Factor} + 1}$$

By monitoring the performance of modems 23 and accordingly modifying performance attributes 61 of modems 23, monitoring module 58 ensures that performance attributes 61 stored in memory 60 accurately reflect the performance of modems 23.

In a particular embodiment, monitoring module 58 may gather information relating to links 22 and/or modems 16 of client computers 12. In such an embodiment, when one of modems 23 receives initiation information from telecommunication interface 50, monitoring module 58 identifies link 22 and/or modem 16 coupled to modem 23. By monitoring whether modem 23 successfully negotiates a connection with modem 16 or by determining the data transfer rate established between modem 23 and modem 16 as described above, monitoring module 58 can indirectly generate performance information related to link 22 and/or modem 16. Monitoring module 58 may store the performance information in memory 60 for use by allocation module 56 in managing the operation of access server 24.

Allocation module 56 receives a modem request from telecommunications interface 50, selects one of available modems 23 for service, and communicates modem identifier 59 associated with selected modem 23 to telecommunications interface 50. In response to receiving a modem request from telecommunications interface 50, allocation module 56 examines performance attributes 61 stored in memory 60 using link 68 and selects one of available modems 23 for service according to performance attribute 61 of selected modem 23. For example, if performance attributes 61 are call success rates, then allocation module 56 may select one of modems 23 for service by identifying available modem 23 with the highest call success rate. Similarly, if performance attributes 61 are average data transfer rates, then allocation module 56 may select one of modems 23 for service by identifying available modem 23 with the highest average data transfer rate. After selecting available modem 23 for service, allocation module 56 communicates modem identifier 59 associated with selected modem 23 to telecommunications interface 50 using link 66. By selecting modems 23 for service according to stored performance attributes 61, allocation module 56 may select higher-performing modems 23 for service over lower-performing modems 23, improving the overall performance of access server 24.

If allocation module 56 receives user identifier 63 with the modem request from telecommunications interface 50, then allocation module 56 identifies user profile 65 associated with user identifier 63 in memory 60 and selects one of available modems 23 for service according to user profile 65. As explained above, each user profile 65 includes information relating to the modem service provided to one or more associated users. In a particular embodiment, user profile 65 indicates a subset of modems 23 assigned to the associated users, and allocation module 56 selects available modem 23 for service from the identified subset of modems 23. In another embodiment, user profile 65 indicates a criterion related to performance attributes 61, and allocation module 56 selects available modem 23 for service according to the criterion and performance attribute 61 of modem 23. For example, if performance attributes 61 are average data transfer rates, the criterion may indicate a minimum or maximum, average data transfer rate. In which case, allocation module 56 selects available modem 23 for service if modem 23 has an average data transfer rate that meets the criterion. By selecting modems 23 for service according to user profiles 65, allocation module 56 can ensure that users receive modem services that satisfy their particular profiles, needs, or service levels.

In addition to selecting modems 23 for service, allocation module 56 removes modems 23 from service according to their performance attributes 61. Allocation module 56 examines performance attributes 61 stored in memory 60 using link 68, identifies modems 23 with performance attributes 61 below a particular performance threshold, and removes identified modems 23 from service. In a particular embodiment, allocation module 56 determines whether the call success rate of modem 23 is below a threshold call success rate and, if the call success rate of modem 23 is below the threshold call success rate, removes modem 23 from service. Similarly, in another embodiment, allocation module 56 determines whether the average data transfer rate of modem 23 is below a threshold data transfer rate and, if the average data transfer rate of modem 23 is below the threshold data transfer rate, removes modem 23 from service. In addition, allocation module 56 may remove one of modem cards 52 from service, if a particular number or percentage of modems 23 associated with modem card 52 have performance attributes 61 below a particular performance threshold. By removing modems 23 or modem cards 52 from service according to performance attributes 61 of modems 23, allocation module 56 prevents modems 23 that provide inadequate service from degrading the overall operation of access server 24.

Allocation module 56 also communicates with network management system 28 to manage the operation of modems 23. First, allocation module 56 communicates status information to network management system 28 using network interface 54. Status information may include information relating to performance attributes 61 of modems 23 or information identifying modems 23 that are in service or removed from service. Network management system 28 receives the status information and presents the status information to a user so that the user may manage the operation of access server 24. For example, a user may notice that modems 23 associated with one of modem cards 52 have significantly below-average performance attributes 61 and, as a result, remove associated modem card 52 from service.

Instead of relying on a user to recognize a degradation in the performance of modems 23, allocation module 56 also communicates alarm conditions to network management system 28 to notify a user of a potential problem with the operation of access server 24. As a result, the user may take prompt action to remedy the problem. For example, allocation module 56 may communicate an alarm condition to network management system 28 whenever allocation module 56 removes one of modems 23 from service or whenever performance attribute 61 of one or modems 23 drops below a performance threshold. Because network management system 28 relays the alarm condition to a user, the user may immediately replace modem 23. By communicating status information and alarm conditions to network management system 28, allocation module 56 allows users to better manage the operation of access server 24 to provide improved service to subscribers. Using network management system 28, a user may communicate control instructions to allocation module 56, instructing allocation module 56 to remove any of modems 23 from service or to return any of modems 23 to service. In an alternative embodiment, network management system 28 automatically uses the status information and alarm condition to manage the operation of access server 24 without user interaction.

Although memory 60, monitoring module 58, and allocation module 56 are described primarily with reference to call success rates and data transfer rates, the discussion applies equally to the use of other performance attributes 61 of modems 23. Allocation module 56 and monitoring module 58 may be implemented in hardware, software, or both. Typically, allocation module 56 and monitoring module 58 are reasonably self-contained so that the tasks assigned to each may be designed, constructed, and updated substantially independent of the specific implementation of the other. Alternative embodiments, however, may not take advantage of the benefits of separate, self-contained modules, and in such embodiments, the functionality of allocation module 56 and monitoring module 58 may be combined and implemented in one or more alternative modules within access server 24.

Figure 3:
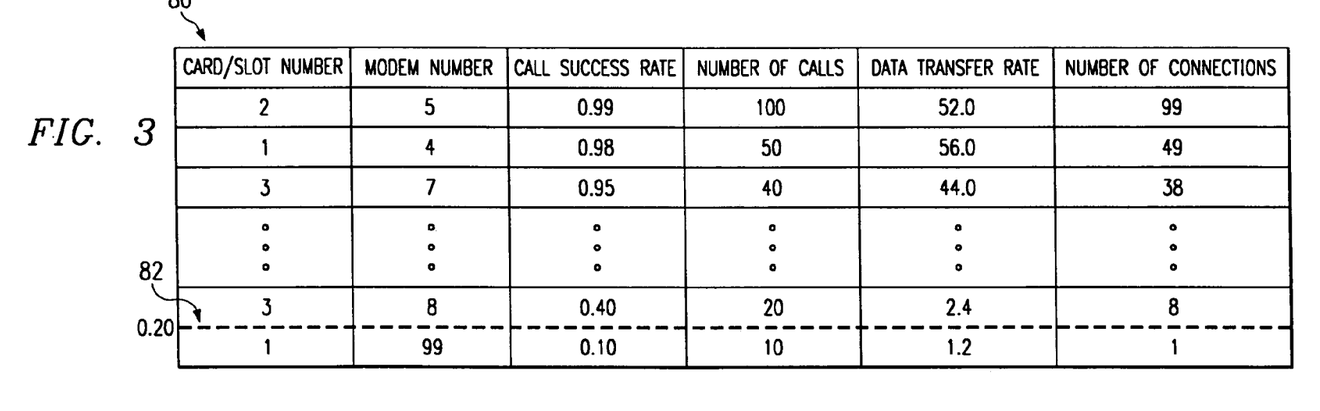
FIG. 3 is an exemplary table of modems with various performance attributes.

FIG. 3 is an exemplary table 80 of modems 23 associated with various performance attributes 61. Each modem 23 is identified by a modem identifier and, if mounted to one of modem cards 52, a card/slot identifier. Although the modem and card/slot identifiers are numbers in the illustrated embodiment, modem identifiers and card/slot identifiers may include numbers, letters, bits, addresses, or any other suitable identification information. Each modem 23 is associated with a call success rate and a data transfer rate. As described above, the call success rate indicates the fraction of calls in which modem 23 successfully negotiated a connection with modems 16 of client computers 12, and the average data transfer rate indicates the average speed at which modem 23 exchanged data with modems 16 of client computers 12 after establishing a successful connection. In addition, each modem 23 is associated with a number of calls, which monitoring module 58 uses to modify the call success rate, and a number of connections, which monitoring module 58 uses to modify the average data transfer rate. For example, modem 23 identified by card slot number 2 and modem number 5 has a call success rate of 0.99 and has received 100 calls. In the 99 connections successfully established by modem 23, modem 23 communicated data with modems 16 of client computers 12 at an average speed of 52.0 kilobits per second. Although, in the illustrated embodiment, table 80 includes both call success rates and data transfer rates, table 80 in alternative embodiments may include only call success rates, only data transfer rates, or any other suitable measure, or combination of measures, of the performance of modems 23.

Table 80 is sorted in descending order according to the call success rates of modems 23. Because, in the illustrated embodiment, allocation module 56 selects modems 23 for service according to the call success rates, modems 23 with high call success rates receive a larger number of calls than modems 23 with low call success rates. As a result, the overall performance of access server 24 is shaped predominately by the performance of modems 23 with high call success rates rather than by the performance of modems 23 with low call success rates. Consequently, access server 24 achieves a higher overall call success rate than prior systems. In an alternative embodiment, table 80 is sorted in descending order according to the data transfer rates of modems 23, and allocation module 56 selects modems 23 for service according to the data transfer rates. In such an embodiment, access server 24 achieves a higher overall data transfer rate than prior systems because modems 23 with high data transfer rates receive a larger number of calls than modems 23 with low data transfer rates.

A dotted line 82 indicates a performance threshold for call success rates of 0.20. If the call success rate of one of modems 23 drops below the performance threshold, then allocation module 56 removes modem 23 from service. For example, modem 23 identified by card/slot number 1 and modem number 99 has a call success rate of 0.10 which is below the threshold. As a result, allocation module 56 removes modem 23 from service. Also, allocation module 56 may communicate to network management system 28 an alarm condition indicating that the call success rate of modem 23 has dropped below the performance threshold of 0.20. In an alternative embodiment, allocation module 56 defines the performance threshold in terms of a data transfer rate rather than a call success rate.

Figure 4:
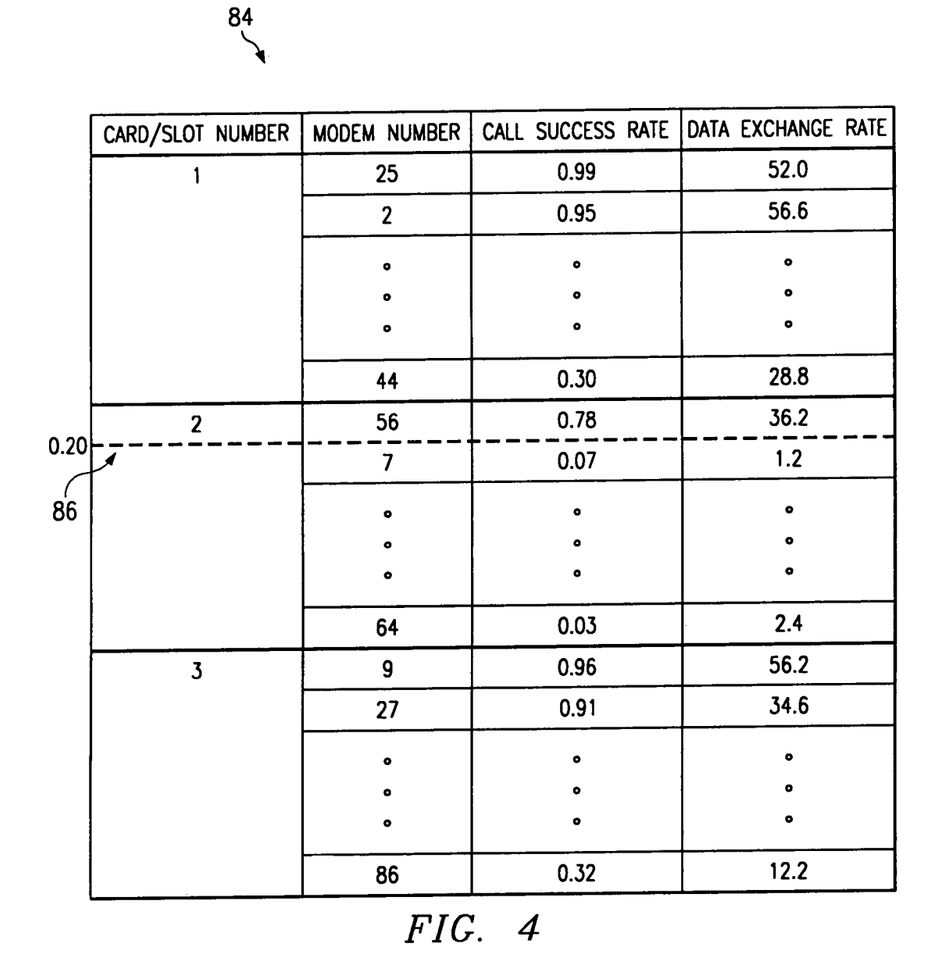
FIG. 4 is an exemplary table of modems organized according to card/slot numbers.

FIG. 4 is an exemplary table 84 of modems 23 organized according to card/slot numbers. Again, each modem 23, identified by a card/slot number and a modem number, is associated with a call success rate and a data transfer rate. Unlike table 80, table 84 is organized according to card/slot numbers. Modems 23 associated with modem cards 52a, 52b, and 52c are grouped separately. Within each separate group, modems 23 are sorted in descending order according to call success rates. Also unlike table 80, table 84 does not associate each modem 23 with a number of calls or a number of connections. In this embodiment, monitoring module 58 performs weighted average calculations and does not need to store a number of calls and a number of connections to modify the call success rates and data transfer rates, respectively.

A dotted line 86 indicates a performance threshold for call success rates of 0.20. If the call success rates of a particular number or percentage of modems 23 associated with one of modem cards 52 drop below the performance threshold, then allocation module 56 removes modem card 52 from service and/or communicates an alarm condition to network management system 28. For example, the call success rates of all but one of modems 23 associated with modem card 52 identified by card/slot number 2 are below the performance threshold of 0.20. As a result, allocation module 56 removes modem card 52 associated with card/slot number 2 from service and/or communicates an alarm condition to network management system 28.

Figure 5A:
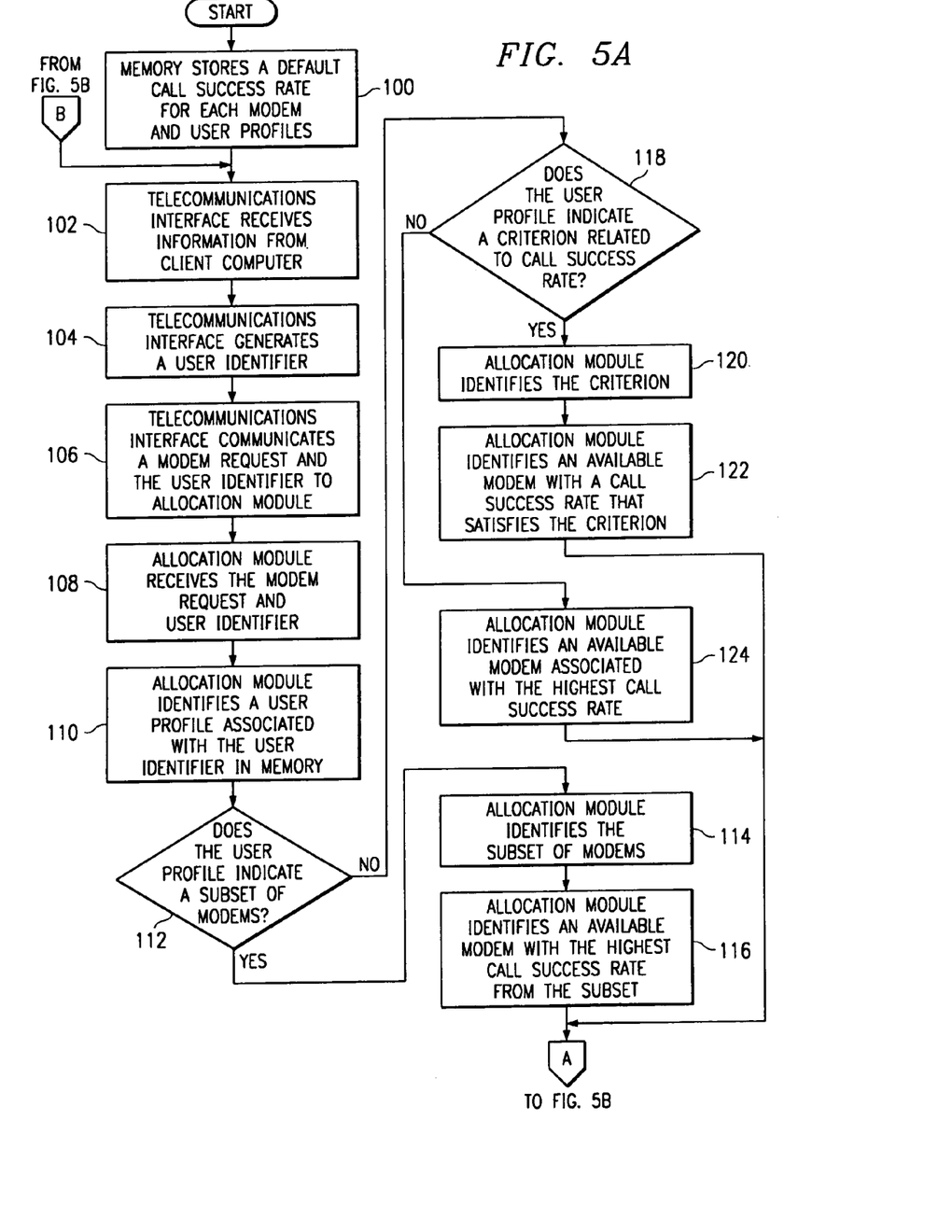
FIGS. 5A and 5B illustrate a flowchart of an exemplary method of selecting a modem for service according to the modem's performance attribute.
Figure 5B:
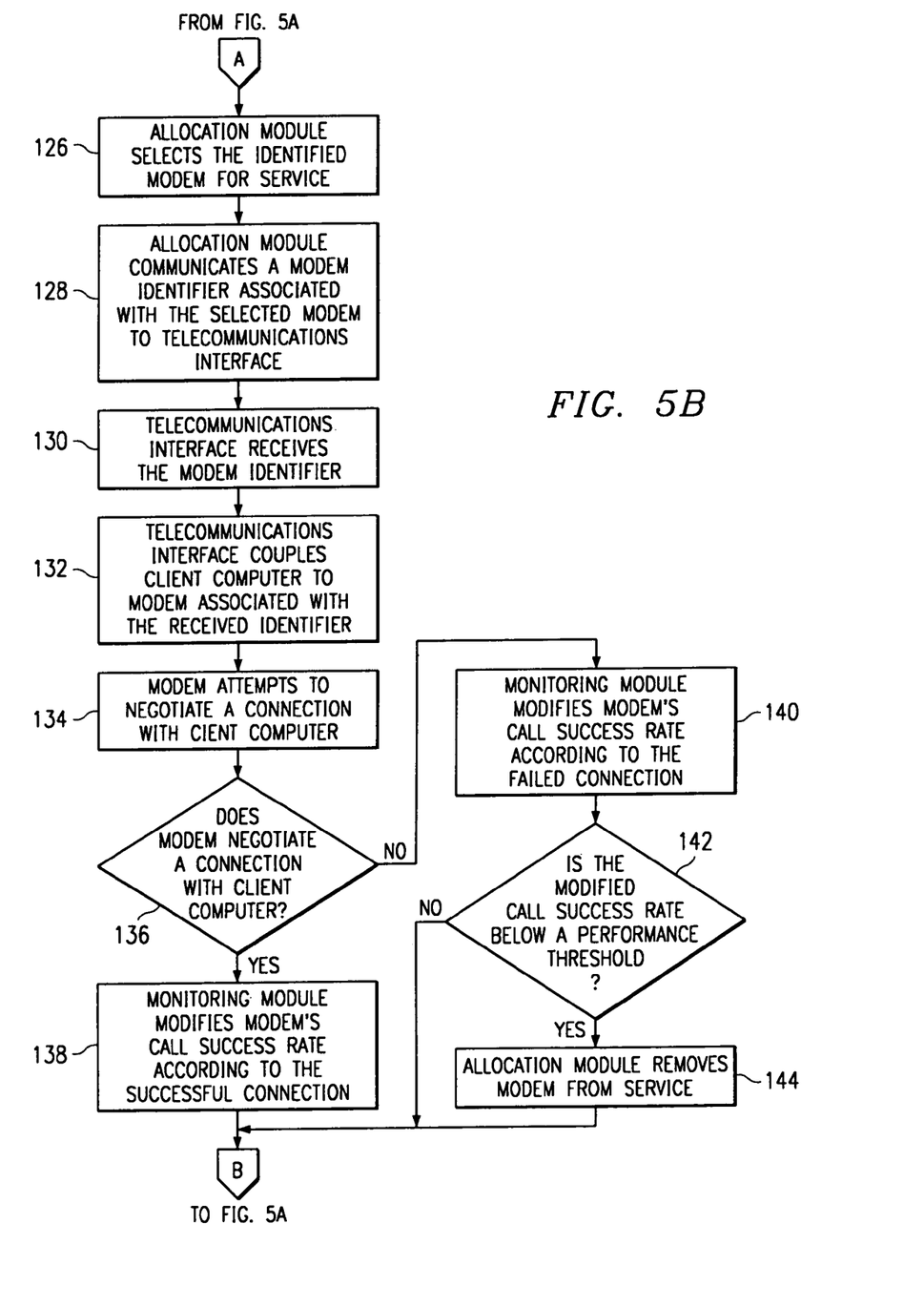

FIG. 5 is a flowchart illustrating an exemplary method of selecting one of modems 23 for service according to the call success rate of selected modem 23. Although the flowchart describes the operation of access server 24 using call success rates, access server 24 can implement the illustrated method of selecting one of modems 23 for service using data transfer rates, or any other suitable characteristic related to the performance of modems 23. The method begins at step 100, where memory 60 stores a default call success rate for each modem 23 and one or more user profiles 65. In a particular embodiment, the default call success rate of modems 23 is 1.00. As explained above, user profiles 65 are associated with one or more users and include information relating to the selection of modems 23 to serve the associated users. At step 102, telecommunications interface 50 receives information from client computer 12. In a particular embodiment, telecommunications interface 50 may generate user identifier 63 in response to receiving the information at step 104. For example, telecommunications interface 50 may identify link 22 from which the initiation information was received and generate user identifier 63 associated with link 22. In another embodiment, telecommunications interface 50 receives user information and generates user identifier 63 according to the user information. At step 106, telecommunications interface 50 communicates a modem request and user identifier 63 to allocation module 56.

Allocation module 56 receives the modem request and user identifier 63 at step 108 and identifies user profile 65 associated with user identifier 63 in memory 60 at step 110. At step 112, allocation module 56 determines whether user profile 65 indicates a subset of modems 23. If user profile 65 indicates a subset of modems, allocation module 56 identifies the subset of modems 23 at step 114. Allocation module 56 then identifies available modem 23 with the highest call success rate from the subset at step 116, and the method continues at step 126. If user profile 65 does not indicate a subset of modems 23 at step 112, allocation module 56 determines whether user profile 65 indicates a criterion related to call success rates at step 118. If user profile 65 indicates a criterion related to call success rates, allocation module 56 identifies the criterion at step 120. Allocation module 56 then identifies available modem 23 with a call success rate that satisfies the criterion at step 122, and the method continues at step 126. If user profile 65 does not indicate a criterion related to call success rates at step 118, then allocation module 56 identifies available modem 23 associated with the highest call success rate at step 124, and the method continues at step 126. Although, in the illustrated embodiment, user profile 65 indicates either a subset of modems 23 or a criterion related to performance attributes 61, user profile 65 in an alternative embodiment may indicate both a subset and a criterion, and allocation module 56 may identify available modem 23 from the subset that satisfies the criterion. Furthermore, as described above, user profiles 65 may include any parameters or conditions that allocation module 56 may use to establish individual or group service levels.

At step 126, allocation module 56 selects identified modem 23 for service. Allocation module 56 communicates modem identifier 59 associated with selected modem 23 to telecommunications interface 50 at step 128, and telecommunications interface 50 receives modem identifier 59 at step 130. In response to receiving the identifier, telecommunications interface 50 couples client computer 12 to modem 23 associated with the received identifier at step 132.

Modem 23 attempts to negotiate a connection with modem 16 of client computer 12 at step 134, and monitoring module 58 determines whether modem 23 successfully negotiates a connection with client computer 12 at step 136. If modem 23 successfully negotiates a connection with client computer 12, then monitoring module 58 modifies the call success rate of modem 23 according to the successful connection at step 138, and the method returns to step 102. If modem 23 fails to negotiate a connection with client computer 12 at step 136, then monitoring module 58 modifies the call success rate of modem 23 according to the failed connection at step 140. Allocation module 56 then determines whether the modified call success rate is below a performance threshold at step 142. If the modified call success rate is below the performance threshold, then allocation module 56 removes modem 23 from service at step 144, and the method returns to step 102. If the modified call success rate is above the performance threshold at step 142, then the method immediately returns to step 102.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An access server, comprising:
   a plurality of modems;
   a monitoring module coupled to the modems, the monitoring module operable, for each of the modems, to determine a performance attribute that indicates operating performance of the modem based on a combination of at least two of multiple independent samples taken over a period of operation of the modem;
   a memory operable to store the performance attribute for each modem;
   an allocation module coupled to the memory and operable to receive a modem request and to select a modem for service according to the modem's performance attribute; and
   a telecommunications interface coupled to the allocation module and operable to couple a remote modem to the selected modem.

2. The access server of claim 1, wherein the monitoring module operable to monitor the selected modem's performance and to modify the performance attribute for the selected modem according to the modem's performance.

3. The access server of claim 1, wherein:
   the memory is further operable to store a plurality of user profiles; and
   the allocation module is further operable to receive a user identifier associated with the modem request, to identify a user profile associated with the user identifier in the memory, and to select a modem for service according to the modem's performance attribute and the user profile.

4. The access server of claim 3, wherein:
   each user profile indicates a subset of modems; and
   the allocation module is further operable to identify a subset of modems according to the user profile and to select a modem for service from the identified subset according to the modem's performance attribute.

5. The access server of claim 3, wherein:
   each user profile indicates a criterion related to a performance attribute; and
   the allocation module is further operable to identify a criterion according to the user profile and to select a modem for service according to the criterion and the modem's performance attribute.

6. The access server of claim 1, wherein the allocation module is further operable to remove a modem from service according to the modem's performance attribute.

7. The access server of claim 1, wherein:
the performance attribute is a call success rate; and
the allocation module selects a modem for service by identifying an available modem associated with the highest call success rate.

8. The access server of claim 1, wherein:
the performance attribute is an average data transfer rate; and
the allocation module selects a modem for service by identifying an available modem associated with the highest average data transfer rate.

9. The access server of claim 1, wherein the modems are digital subscriber line (DSL) modems.

10. A method of selecting a modem for service, comprising:
determining for each of a plurality of modems, a performance attribute that indicates operating performance of the modem based on a combination of at least two of multiple independent samples taken over a period of operation of the modem;
storing the performance attribute for each modem;
receiving a modem request;
selecting a modem for service according to the modem's performance attribute; and
coupling a remote modem and the selected modem.

11. The method of claim 10, further comprising:
monitoring the selected modem's performance; and
modifying the performance attribute for the selected modem according to the modem's performance.

12. The method of claim 10, further comprising:
storing a plurality of user profiles;
identifying a user profile associated with the modem request; and
selecting a modem for service according to the modem's performance attribute and the user profile.

13. The method of claim 12, further comprising:
identifying a subset of modems associated with the user profile; and
selecting a modem for service from the identified subset according to the modem's performance attribute.

14. The method of claim 12, further comprising:
identifying a criterion according to the user profile, the criterion related to the performance attributes of the modems; and
selecting a modem for service according to the criterion and the modem's performance attribute.

15. The method of claim 10, further comprising removing a modem from service according to the modem's performance attribute.

16. The method of claim 10, wherein:
the performance attribute is a call success rate; and
selecting a modem for service according to the modem's performance attribute comprises identifying an available modem associated with the highest call success rate.

17. The method of claim 10, wherein:
the performance attribute is an average data transfer rate; and
selecting a modem for service according to the modem's performance attribute comprises identifying an available modem associated with the highest average data transfer rate.

18. The method claim 10, wherein the modems are digital subscriber line (DSL) modems.

19. An apparatus for selecting a modem for service, comprising:
a monitoring module operable, for each of a plurality of modems, to determine a performance attribute that indicates operating performance of the modem based on a combination of at least two of multiple independent samples taken over a period of operation of the modem;
a memory operable to store the performance attribute for each modem; and
an allocation module coupled to the memory and operable to receive a modem request, to select a modem for service according to a performance attribute stored in the memory, and to communicate a modem identifier associated with the selected modem.

20. The apparatus of claim 19, wherein the monitoring module is further operable to monitor the selected modem's performance and to modify the performance attribute for the selected modem according to the modem's performance.

21. The apparatus of claim 19, wherein:
the memory is further operable to store one or more user profiles; and
the allocation module is further operable to identify a user profile associated with the modem request and to select a modem for service according to the user profile.

22. The apparatus of claim 21, wherein the allocation module is further operable to identify a subset of modems according to the user profile and to select a modem for service from the identified subset according to the modem's performance attribute.

23. The apparatus of claim 21, wherein the allocation module is further operable to identify a criterion according to the user profile and to select a modem for service according to the criterion and the modem's performance attribute.

24. The apparatus of claim 19, wherein the allocation module is further operable to remove a modem from service according to the modem's performance attribute.

25. The apparatus of claim 19, wherein:
the performance attribute is a call success rate; and
the allocation module selects a modem for service by identifying an available modem associated with the highest call success rate.

26. The apparatus of claim 19, wherein:
the performance attribute is an average data transfer rate; and
the allocation module selects a modem for service by identifying an available modem associated with the highest average data transfer rate.

27. The apparatus of claim 19, wherein the modems are digital subscriber line (DSL) modems.

28. Modem selection software embodied in a computer-readable medium and operable to perform the following steps:
determining, for each of a plurality of modems, a performance attribute that indicates operating performance of the modem based on a combination of at least two of multiple independent samples taken over a period of operation of the modem;
storing the performance attribute for each modem;
receiving a modem request;
selecting a modem for service according to the modem's performance attribute; and
coupling a remote modem and the selected modem.

29. The modem selection software of claim 28, further operable to perform the following steps:
monitoring the selected modem's performance; and modifying the performance attribute for the selected modem according to the modem's performance.

30. The modem selection software of claim 28, further operable to perform the following steps:
storing a plurality of user profiles;
identifying a user profile associated with the modem request; and
selecting a modem for service according to the modem's performance attribute and the user profile.

31. The modem selection software of claim 30, further operable to perform the following steps:
identifying a subset of modems associated with the user profile; and
selecting a modem for service from the identified subset according to the modem's performance attribute.

32. The modem selection software of claim 30, further operable to perform the following steps:
identifying a criterion according to the user profile, the criterion related to the performance attributes of the modems; and
selecting a modem for service according to the criterion and the modem's performance attribute.

33. The modem selection software of claim 28, further operable to perform the step of removing a modem from service according to the modem's performance attribute.

34. The modem selection software of claim 28, wherein:
the performance attribute is a call success rate; and
selecting a modem for service according to the modem's performance attribute comprises identifying an available modem associated with the highest call success rate.

35. The modem selection software of claim 28, wherein:
the performance attribute is an average data transfer rate; and
selecting a modem for service according to the modem's performance attribute comprises identifying an available modem associated with the highest average data transfer rate.

36. The modem selection software of claim 28, wherein the modems are digital subscriber line (DSL) modems.

* * * * *